US008010565B2

(12) United States Patent
Gujarathi et al.

(10) Patent No.: US 8,010,565 B2
(45) Date of Patent: Aug. 30, 2011

(54) ENTERPRISE RACK MANAGEMENT METHOD, APPARATUS AND MEDIA

(75) Inventors: Manoj Gujarathi, Round Rock, TX (US); Jimmy D. Pike, Georgetown, TX (US); Drus Reeves, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 11/549,935

(22) Filed: Oct. 16, 2006

(65) Prior Publication Data

US 2008/0091701 A1    Apr. 17, 2008

(51) Int. Cl.
*G06F 7/00* (2006.01)
*G06F 17/30* (2006.01)

(52) U.S. Cl. ......................... 707/791; 709/225

(58) Field of Classification Search .............. 707/103 R, 707/791, 999.103 R, 792; 709/225
See application file for complete search history.

(56) References Cited

U.S. PATENT DOCUMENTS

| 7,072,807 | B2 | 7/2006 | Brown et al. | |
|---|---|---|---|---|
| 7,577,092 | B2 * | 8/2009 | San Andres et al. | 370/230 |
| 2004/0093381 | A1 | 5/2004 | Hodges et al. | |
| 2005/0010499 | A1 | 1/2005 | Farkas et al. | |
| 2005/0050272 | A1 | 3/2005 | Behrens et al. | |
| 2005/0091227 | A1 | 4/2005 | McCollum et al. | |
| 2006/0041444 | A1 | 2/2006 | Flores et al. | |
| 2007/0156842 | A1 * | 7/2007 | Vermeulen et al. | 709/217 |

OTHER PUBLICATIONS

Erik Svensson, "Data Consistency in a Heterogeneous IT Landscape: A Service Oriented Architecture Approach", 2004.*
D W Chadwick, "Understanding X.500—The Directory", 1996, available online: http://sec.cs.kent.ac.uk/x500book/.*
Nancy McLain, "What Is a Directory Service?", May 12, 2000, Novell.*
Winston Bumpus, "CIM Directory Mappings: DMF Standards for DEN", Jun. 13, 2002, entire document, but especially p. 40.*
Wayne State University School of Medicine, "Directory Services", 2004, available online: http://web.archive.org/web/20040821192012/www.med.wayne.edu/msis/networking/dirservices.asp.*
Editor Ryan Moats, "DMTF LDAP Schema for the CIM v2.5 Physical Information Model", Jun. 5, 2001, Distributed Management Task Force, Inc., entire document, but especially p. 11, section 3.1.*

* cited by examiner

*Primary Examiner* — Yicun Wu
*Assistant Examiner* — Brannon W Smith
(74) *Attorney, Agent, or Firm* — Garrana Tran; Andrea E. Tran

(57) ABSTRACT

An information handling system having a processor and a computer readable medium accessible by the processor and having stored thereon a data structure operable as a directory service. The data structure includes a field comprising an service level object representing a service and comprising data defining roles for the service level object, and policies for service level object. The data structure also includes a field comprising a rack object map subordinate to and in relationship with the service level object, representing hardware or software supporting the service, and comprising data defining roles for the rack object map, policies for the rack object map, and service oriented architecture polices for the rack object map.

14 Claims, 3 Drawing Sheets

ENTERPRISE RACK MANAGEMENT METHOD, APPARATUS AND MEDIA

BACKGROUND

1. Technical Field

The present disclosure relates generally to information handling systems and, more particularly, to enterprise architecture.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

According to one non-limiting embodiment there is provided a computer readable medium having stored thereon a data structure operable as a directory service. The data structure may include a first data field comprising an service level object map representing a data center and comprising data defining roles for the service level object map and policies for service level object map. The data structure may also include a second data field comprising a rack-level rack object map subordinate to and in relationship with the service level object map, representing a rack and supporting the directory service, and comprising data defining roles for the rack object map, and policies for the rack object map.

According to another non-limiting embodiment there is provided a method of operating an information handling system. The method may include executing a software application to access a rack. The method may also include accessing a directory service. Generally, the directory service comprises data configured with an service level object map representing a service and comprising data defining roles for the service level object map, and policies for service level object map. The directory service also includes data configured with a rack object map subordinate to and in relationship with the service level object map, representing hardware or software supporting the service, and comprising data defining roles for the rack object map, and policies for the rack object map. The method may also include authenticating access of the software application to the rack based on the directory service.

According to another embodiment there is provided an information handling system that may include a processor and computer readable medium accessible by the processor and having stored thereon a data structure operable as a directory service. The data structure may include a first field comprising an service level object map representing a service and comprising data defining roles for the service level object map, and policies for service level object map. The data structure may also include a second field comprising a rack object map subordinate to and in relationship with the service level object map, representing hardware or software supporting the service, and comprising data defining roles for the rack object map, and policies for the rack object map.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1A:
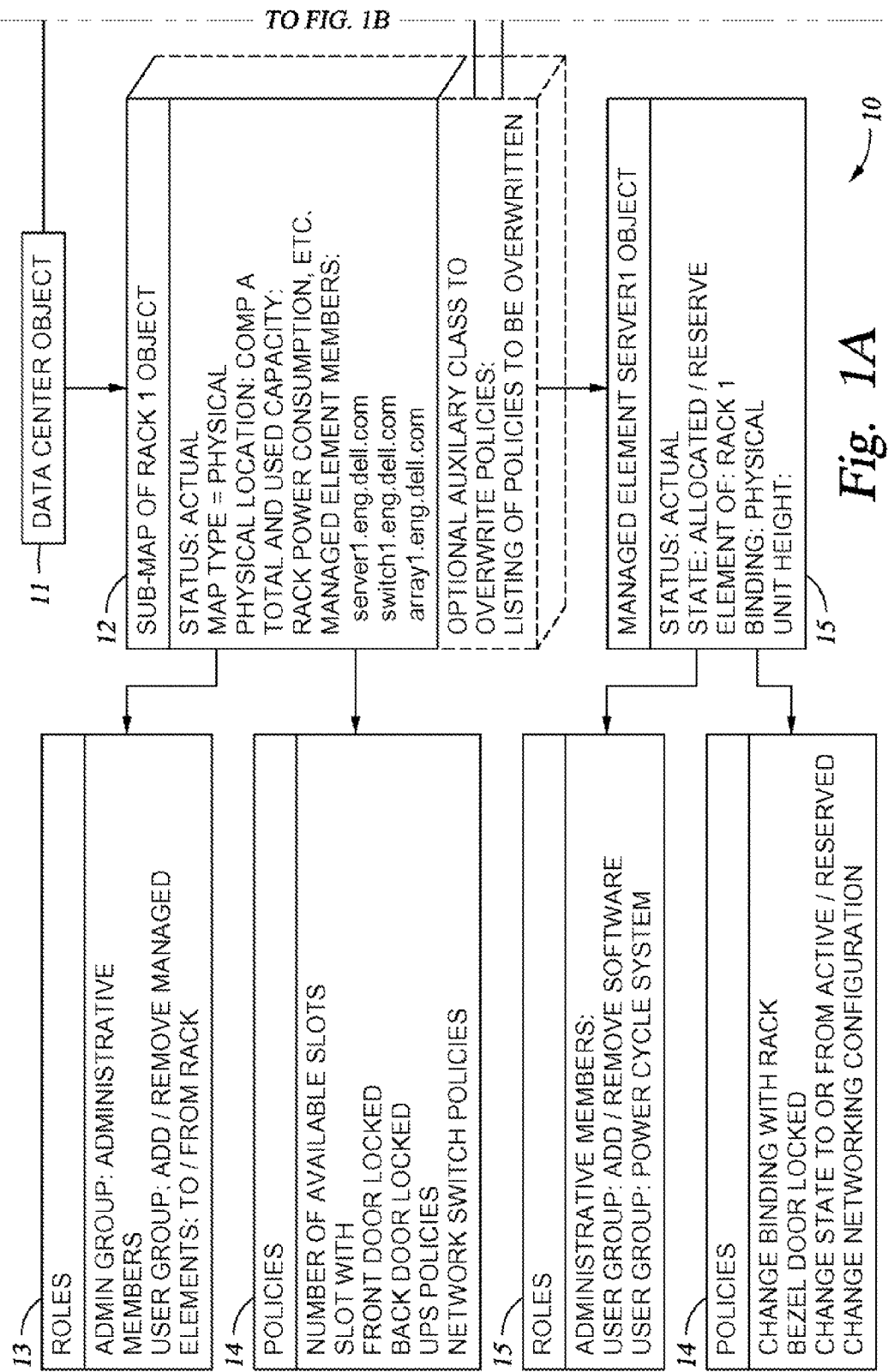
FIG. 1 is a schematic showing a non-limiting embodiment of directory service architecture with rack object sub-maps.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

With the growth of the Internet and globalization of business, the computer systems and networks that businesses use have become extremely complex. In recent years, businesses have moved towards using Enterprise Architecture to manage business networks. Enterprise Architecture is the application of a comprehensive and rigorous method for describing a current or future structure for an organization's processes, information systems, personnel and organizational sub-units, so that they align with the organization's core goals and strategic direction. Generally, Enterprise Architecture is related to business optimization in that it addresses business architecture, performance management and process architecture as well as information technology. While the following disclosure mainly discusses complex computer networks in an enterprise architecture, the invention is not limited to complex computer networks or computer networks. For example, the inventory of a business may be a component of systems discussed below.

A directory service is a software application or a set of applications that stores and organizes information about a computer network's users and network shares, and that allows network administrators to manage users' access to the shares. Additionally, directory services act as an abstraction layer between users and shared resources.

A directory service should not be confused with the directory repository itself, which is the database that holds information about named objects that are managed in the directory service. In the case of the certain distributed directory services model, one or more name spaces (trees of objects) are used to form the directory service. The directory service provides the access interface to the data that is contained in one or more directory name spaces. The directory service interface acts as a central/common authority that can securely authenticate the system resources that manage the directory data.

As per a database, a directory service is highly optimized for reads and provides advanced search on the many different attributes that can be associated with objects in a directory. The data that is stored in the directory is defined by an extendible and modifiable schema. Directory services use a distributed model for storing their information and that information is usually replicated between directory servers.

There are many companies manufacturing or developing hardware and/or software for use in large scale business network environments. As a business develops, hardware and software products will be acquired to expand or improve an enterprise network system to manage growing demands. Because these new or existing businesses typically do not purchase everything from the same hardware/software manufacturer, new hardware or software components may not be compatible with the currently used components purchased in the past. One option is to purchase a new set of hardware and software that is known to be compatible when new demands arise. However, because of the lack of predictability in a businesses future need, purchasing an entirely new set of hardware and software components to meet business demands is rarely feasible and is in many cases uneconomical.

One of the methods used to allow complex architecture to work properly has been to create custom coding and scripting to manage interaction and communication between disparate devices and software packages to accomplish desired tasks. Another method is to create custom shims/applications that act as resource managers emulating human interaction. However, custom shims/applications are cumbersome not scalable, prone to failure, and have security problems.

Figure 1B:
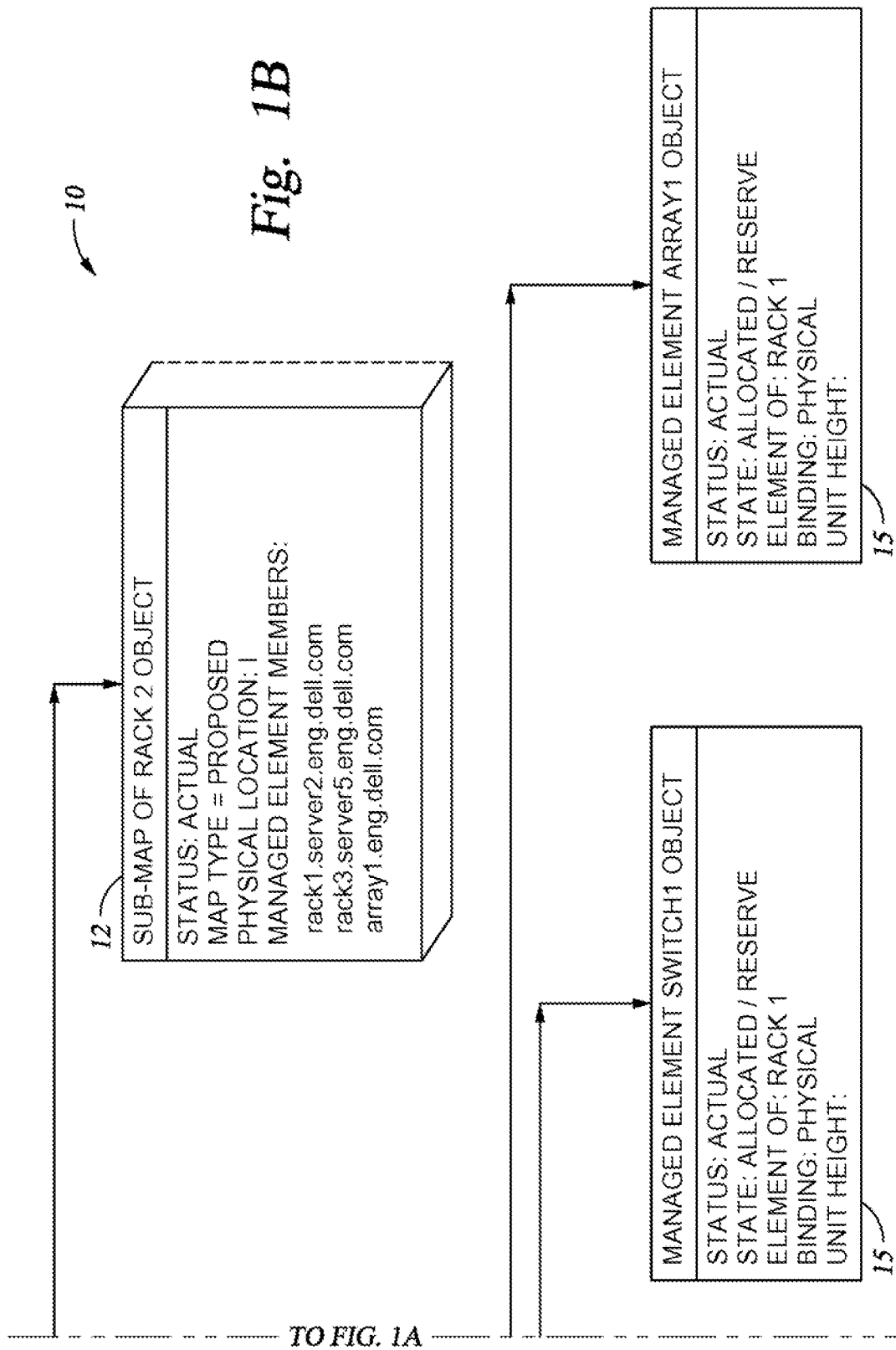

Referring now to FIG. 1, there is illustrated a non-limiting example of Service Oriented Architecture (SOA) as utilized to manage a rack. In general, SOA is a business-driven approach to software architecture that supports integrating the business as a set of linked, repeatable business tasks, or "services". Services are self-contained, reusable software modules with well-defined interfaces and are independent of applications and the computing platforms on which they run. SOA helps businesses innovate by ensuring that a company's information technology system can adapt quickly, easily and economically to support rapidly changing business needs.

More specifically in FIG. 1 is illustrated a non-limiting embodiment of directory service architecture with rack object sub-maps. Specifically, in a non-limiting example, there is shown a data structure 10 operable as a directory service. At a service level is an object representing a service such as data center object map 11. At rack level are rack object maps 12 subordinate to and in relationship to service level data center object map 11. Data center object map 11 may also be associated with roles, policies, and service oriented architecture policies.

The various authorization roles 13 and configuration policies 14 are associated with various rack maps 12 and managed elements 15 in datacenter 11. Roles 13 may define an object's or user's access control rights. In a non-limiting example, roles 13 may indicate who/what can create, run, or modify an application. As another non-limiting example, with regard to a memory device, roles 13 may indicate who/what can have full access, read only access, or write only access. Further, roles 13 may contain default access control rights. As a non-limiting default example, an "administrator" role may have full access to everything, members of group 1 may have unlimited access to certain memory devices and members of group 2 may have restricted access to those same memory devices.

Policies 14 are configuration parameters or actions to be performed. In a non-limiting example, policies may indicate the number of available slots, number of memory devices available in inventory, network switching policies, changes to network configuration, and/or configuration or change agents that associate an action with these policies. In addition implementing operational procedures for the hardware and software, various policies may be utilized to implement various business procedures and goals. It is not unusual for each managed element and each object to have both a role and a policy associated with it.

In this non-limiting example, for data center 11 various rack-level rack object maps 12 are created to group managed rack elements through dynamic bindings of logical and physical entities. This creates a self-serving infrastructure so that applications can use this infrastructure to provision any managed element 15 or group these into bindings that form a rack 12.

As a non-limiting example, rack-level rack maps 12 may comprise one or more managed element level managed elements 15 which may be subordinate to and in relationship with rack-level rack maps 12. Additionally, each rack-level rack map 12 may be associated with its own roles 13 and policies 14. Non-limiting examples of managed elements 15 may include a storage area network (SAN) rack, network, stack of services, grouping of software, or a redundant array of independents disks (RAID).

A rack is a frame or cabinet in which components of an information handling system are housed. A rack may be a simple structure functioning to house components, or as a non-limiting example, may also include cooling, power distribution, cable management, sound attenuation, environmental monitoring, electronic security, controlled entry hardware, and/or fire protection equipment. A rack may be equipped with locks, latches, or keyless entry. A rack may have sliding shelves, fixed shelves or drawers. A rack may be wall mounted, wall supported, stand alone, floor mounted, secured to other racks, and/or on casters (wheels). A rack may be open frame, partially enclosed, or fully enclosed. There are a number of accessories which may be added to a rack including, side panels, doors, split doors, roofs, panels to direct internal air circulation, and cable management items.

With the standardization of enterprise data centers, the rack is an integral part of an information system environment. For a rack hosting a stock of devices, various non-limiting embodiments of the present disclosure provide a unified way to determine information about the assets in a rack. Such information includes, but is not limited to, rack space, power needs of server stock, and overheating. Without the present disclosure, much of this asset tracking is otherwise labor intensive. Non-limiting embodiments of the present disclosure also provide a standardized way to configure or manage a rack (dumb or smart) through single access control, and to dynamically allocate/reserve rack elements depending on scalability needs. It should be understood that any rack 12 may be a physical rack, that is, all of the managed elements are physically contained within a single rack, or rack 12 may be a virtual rack, that is, managed elements are contained with two or more distinct physical racks, but are considered to be grouped into a rack.

The managed elements 15 can be considered children of rack objects 12 or sub-maps thereof, and the managed elements may also have associated therewith roles 13 and policies 14. A managed element 15 can be any hardware and/or software resource which is grouped into a rack 12, non-limiting examples of managed elements may include storage devices, arrays, servers, switches, laptops, fiber channel switches. Ethernet switches, handheld devices, printers, or applications.

As illustrated, the present non-limiting disclosure illustrates an SOA approach to create a data structure 10 operable as a directory service organizing data center 11 into racks 12 and managed elements 15, including hardware and software therefore, according to a physical and/or logical relationship. In more detail, this disclosure addresses the complexity of managing relationships between managed hardware and/or software elements by utilizing a directory service to group racks 12 and managed elements 15 into service oriented associations as defined by data center 11 and mapping objects. In a non-limiting embodiment, self describing objects are created where the actual data becomes the interface.

In even more detail, the proposed solution provides methods, apparatus and products to create a directory service schema for mapping of disparate rack elements. It enables asset management of rack elements 15, centralized tracking and monitoring of various racks 12 (e.g. heating, power dissipation, units available, etc), and gives single point access control for administration. It also promotes data center 11 organization making it easier for service-oriented applications, such as, a provisioning application, to determine available assets in a data center to address business scalability needs. Such data center organization may include one or more of the following: the provision for a directory service extension for a rack as specific sub-map of data center map; the provision for a directory service extension of roles and policies specific to a rack; the provision for the use of the directory service as a location protocol to manage rack assets; and, the provision for enabling the creation of virtual racks through dynamic logical grouping of managed elements, regardless of the physical location of those managed elements.

Thus, a directory service is created by grouping objects and managed elements according to their logical and/or physical relationships. In a non-limiting example, a first office may contain one or more racks, and a second office may also contain one or more racks. The directory service maps the hardware and software elements in the first and second offices as rack object maps 12 and managed element object maps 15. These map objects and managed elements may create a directory service that can be used by a client application to manage and control the network. In the non-limiting embodiment discussed above, the map objects and managed elements function as an interface. However, it should be noted that map objects and managed elements do not have to be created according to physical relationships. A directory service may be created based on a logical relationship.

In another non-limiting embodiment, the present disclosure illustrates how a directory service may be used by an application to manage and monitor a rack. During execution of an application, certain predetermined events may require a response to resolve the situation. These events act as triggers that cause the application to access the directory service. The directory service may contain one or more racks, which may house one or more services, map objects, managed elements, and/or their respective roles and policies. When the application accesses the directory service, the application uses the directory service to determine the proper response to the predetermined event. The application may access certain map objects and managed elements to determine their respective roles and policies. The proper response may require the allocation of certain hardware/software for other uses or the response may simply require data to be sent to a certain location. Finally, instructions to implement the proper response are generated based on the directory service. In this non-limiting embodiment, the actual data in directory service functions as the interface.

Referring still to FIG. 1, data center map extension is provided to include unique rack sub-map classes for each rack object 12. For each managed element 15, a unique data service object is created associating then managed element 15 with a role object 13 and a policy object 14. Roles 13 and policies 14 can be unique or combined for different rack elements 15. As discussed above, roles 13 define access levels; whereas, policies 14 are created to define configuration of rack (manual or automated). As a non-limiting example, the rack sub-map object may be extended into an auxiliary class to define overwrite policies.

As a non-limiting example of a method of the present disclosure for asset tracking and configuration of rack, may include one or more of the following steps: an application logins and authenticates to the directory service; an application reads the rack 1 object to capture information, non-limiting examples of which may include: rack 1 location, element stock in rack 1, and any other desired rack asset information; and an application with suitable administrative rights, sets rack policies in policy object and/or auxiliary class that can be used to over-write policies.

Figure 2:
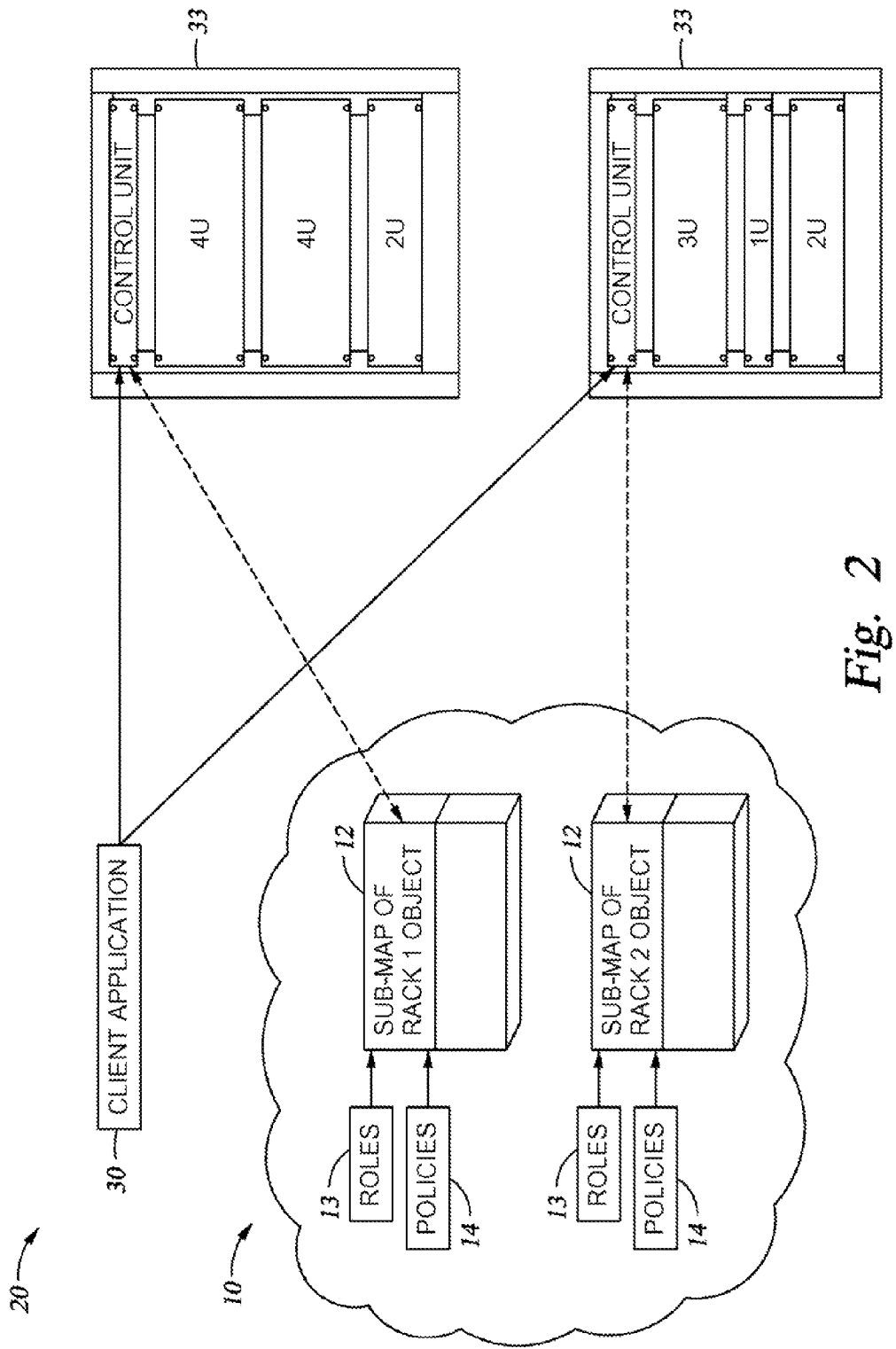
FIG. 2 is a schematic showing a non-limiting embodiment for authenticating a physical rack 33 with a directory service 10.

Referring now to FIG. 2, there is shown a schematic relating to a non-limiting embodiment for authenticating a physical rack 33 with a directory service 10. This non-limiting embodiment may include on or more of the following steps. A client application 30 browses a number of racks 33, shown as a 14 unit rack 1 and a 10 unit rack 2. Of course, it is understood that any suitable number of racks, each with any suitable number of units, may be utilized. Client application 30 provides username and password information to authenticate access to the rack. An application for both racks 33 then logs-in to the directory service, passing the same username/password that is configured for access. The rack application references the corresponding rack map 12, then determines client rights from roles 13, and configurable policies from policies 14. Ultimately, rack 33 serves the requests from the client application based on rights and policies in directory service 10.

Various non-limiting embodiments of this disclosure facilitate logical grouping and dynamic allocation of rack elements to address enterprise scalability needs by controlling available and allocated resource stock.

Various non-limiting embodiments of this disclosure allow customers to orchestrate rack resources depending on business needs and offers organization of data center into manageable/discoverable data. The present disclosure provides for defining scalable enterprise architecture.

In non-limiting embodiments, part or all of the data structures described herein may be stored on one or more computer readable media or transmitted in a propagated signal. In further non-limiting embodiments, part or all of the methods described herein may be described as instructions for an information handling system, and stored on one or more computer readable media or transmitted by a propagated signal.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A computer readable medium having stored thereon a data structure operable as a directory service, the data structure comprising:
    a first data field comprising a service level object map representing a data center and comprising data defining roles for the service level object map and policies for the service level object map, wherein the roles comprise object access control rights, user access control rights, or default access control rights, and wherein policies comprise configuration parameters or actions to be performed;
    a second data field comprising a rack-level rack object map and in relationship with the service level object map, representing a rack and supporting the directory service, and comprising data defining roles for the rack object map, and policies for the rack object map, wherein the policies for the rack object map are created to group a plurality of managed rack elements through dynamic bindings of entities, and wherein the rack object map is extendable into an auxiliary class to define overwrite policies for the rack object map; and
    a third data field comprising a managed element object map in relationship with each rack object map, representing server, storage device, or switch, supporting the service, and comprising data defining roles for the managed element object map, and policies for the managed element object map.

2. The computer readable medium of claim 1, wherein the data structure further comprises a third data field, comprising a managed element object map subordinate to and in relationship with the rack object map, representing hardware or software supporting the directory service, and comprising data defining roles for the managed element object map, and policies for managed element object map.

3. The computer readable medium of claim 1, wherein the directory service comprises a data center.

4. The computer readable medium of claim 3, comprising at least two second data fields.

5. A method of operating an information handling system comprising:
    executing a software application to access a rack;
    accessing a directory service, wherein the directory service comprises data configured with:
        a service level object map representing a service and comprising data defining roles for the service level object map, and policies for the service level object map, wherein the roles comprise object access control rights, user access control rights, or default access control rights, and wherein policies comprise configuration parameters or actions to be performed; and
        a rack object map in relationship with the service level object map, representing hardware or software supporting the service, and comprising data defining roles for the rack object map, and policies for the rack object map, wherein the policies for the rack object map are created to group a plurality of managed elements through dynamic bindings of entities, and wherein the rack object map can is extendable into an auxiliary class to define overwrite policies for the rack object map;
        at least one managed element object map in relationship with each rack object map, representing server, storage device, or switch, supporting the service, and comprising data defining roles for the managed element object map, and policies for the managed element object map; and
    authenticating access of the software application to the rack based on the directory service.

6. The method of claim 5, wherein the software application provides username and password information.

7. The method of claim 5, wherein the directory service further comprises a managed element object map subordinate to and in relationship with the rack object map, representing hardware or software supporting the service, and comprising data defining roles for the managed element object map, and policies for the managed element object map.

8. The method of claim 5, wherein the directory service represents a data center.

9. The method of claim 8, wherein the data comprises at least two rack object maps.

10. An information handling system comprising:
    a processor;
        computer readable medium accessible by the processor and having stored thereon a data structure operable as a directory service, the data structure comprising:
            a first field comprising a service level object map representing a service and comprising data defining roles for the service level object map, and policies for the service level object map, wherein the roles comprise object access control rights, user access control rights, or default access control rights, and wherein policies comprise configuration parameters or actions to be performed;
            a second field comprising a rack object map in relationship with the service level object map, representing hardware or software supporting the service, and comprising data defining roles for the rack object map, and policies for the rack object map, wherein the policies for the rack object map are created to group a plurality of managed rack elements through dynamic bindings of entities, and wherein the rack object map is extendable into an auxiliary class to define overwrite policies for the rack object map; and
            a third data field comprising a managed element object map in relationship with each rack object map, representing server, storage device, or switch, supporting the service, and comprising data defining roles for the managed element object map, and policies for the managed element object map.

11. The system of claim 10 further comprising an application configured to examine data from the information handling system, wherein the application is configured to communicate with the directory service in order to determine roles and policies.

12. The system of claim 10, wherein the data structure further comprises a managed element object map subordinate to and in relationship with the rack object map, representing hardware or software supporting the service, and comprising data defining roles for the managed element object map, and policies for the managed element object map.

13. The system of claim 10, wherein the service comprises a data center.

14. The system of claim 13, comprising at least two rack object maps.

* * * * *